United States Patent [19]

Artrip

[11] 4,017,775
[45] Apr. 12, 1977

[54] FAULT DETECTOR CIRCUIT WITH TWO-FAULT MEMORY

[75] Inventor: Robert W. Artrip, Northfield, Ohio

[73] Assignee: Cleveland Machine Controls, Inc., Cleveland, Ohio

[22] Filed: Oct. 28, 1975

[21] Appl. No.: 626,502

[52] U.S. Cl. .................................. 318/139; 361/28
[51] Int. Cl.² .......................................... H02P 3/08
[58] Field of Search ......... 317/31, 36 TD; 318/139; 323/19, 22 SC; 321/45 C

[56] References Cited

UNITED STATES PATENTS

| | | | |
|---|---|---|---|
| 3,766,436 | 10/1973 | Zocholl | 317/36 TD |
| 3,902,105 | 8/1975 | Delaney et al. | 318/139 X |
| 3,914,675 | 10/1975 | Konrad | 318/139 X |

Primary Examiner—A. D. Pellinen
Attorney, Agent, or Firm—Phillips, Moore, Weissenberger, Lempio & Majestic

[57] ABSTRACT

A fault detector circuit in a silicon controlled rectifier (SCR) control for series-connected direct-current motors in which current to the motor flows in pulses through a main SCR as the main SCR is repeatedly turned on and off. If during operation the main SCR shorts, the field winding is disconnected from the armature and maintained disconnected. If during operation the main SCR is not defective but fails to commutate, the field winding is disconnected from the armature and then reconnected thereto. If the main SCR again fails to commutate, the field winding is again disconnected from the armature and is maintained disconnected therefrom.

4 Claims, 2 Drawing Figures

FAULT DETECTOR CIRCUIT WITH TWO-FAULT MEMORY

BACKGROUND OF THE INVENTION

This invention relates to a control for direct current motors utilizing silicon controlled rectifiers (SCr's) to supply power to the motor and in particular to a circuit for safeguarding against shorting or commutation failure of the main SCR.

It is well known that the direct current supplied to a motor from a constant potential power source such as a battery may be selectively varied by controlling the average power to the motor and that a solid state SCR can be used as a switching device to repeatedly connect and disconnect the battery to and from the motor. The power supplied to the motor is determined by the ratio between the time the SCR is turned on and conducts and the time the SCR is turned off and is non-conducting. The greater this ratio of conduction to non-conduction, the more power there will be to the motor. Typically in vehicles having a direct current propulsion motor and an SCR control therefor, the ratio of conduction to nonconduction is varied by adjusting the frequency at which the main SCR is turned on by means of a pulse generator whose rate is controlled in response to a foot-actuated accelerator pedal.

In operation there are a number of malfunctions which can occur in an SCR control, and this invention is related to two of these malfunctions.

First, the main SCR may short so that it cannot be commutated, or turned off. In such case, the ratio of conduction to non-conduction becomes and stays at a maximum (since there is no non-conduction), full power is delivered to the motor and the operator loses control. It is thus desirable that a shorting of the main SCR be detected and the motor disabled so that further operation of the vehicle is suspended until the defective SCR is replaced.

Secondly, during operation the commutation circuit can occasionally fail to commutate the main SCR and the main SCR stays on. Very often the fault in the commutation circuit will clear itself if the power to the main SCR circuit is turned off and then on again and normal cycling of the main SCR is resumed.

A commutation failure which does not turn the main SCR off has the same immediate result as a shorted SCR, namely, the current to the motor is now continuous.

Thus, a fault detecting system should distinguish between a shorting of the main SCR (wherein the SCR is incapable of being turned off) and a commutation failure (wherein the SCR is capable of being turned off but is not). If the main SCR is shorted, the motor should be disabled. In the latter event, the fault-detecting system should cause commutation of the SCR and then allow operation to continue, without attention by the operator, if the commutation circuit has cleared itself. If the commutation circuit continues to malfunction then the motor should be disabled so that the defect can be repaired.

SUMMARY OF THE INVENTION

The present invention provides a fault-detecting circuit capable of distinguishing between shorting and commutation failure of the main SCR.

During normal operation the anode voltage of the main SCR will fluctuate at a rate determined by the pulse frequency of the control system. When the main SCR is conducting its anode voltage will be low, when non-conducting its anode voltage will be high. The anode voltage is continuously monitored and applied to a timing circuit having a period greater than the maximum normal on-time of the main SCR. If the main SCR is functioning properly, every time it is turned off the timing circuit is reset. If the main SCR shorts, or fails to commutate, the timing circuit times out and causes the field winding to be disconnected from the armature.

The control system will then attempt to reconnect the field winding to the armature. If the SCR is shorted, the timing circuit will not reset following disconnection of the field from the armature and will prevent reconnection of the field and armature.

If the main SCR is not shorted and commutates when the field is disconnected from the armature, its anode potential will be high when the field is reconnected to the armature and the timing circuit is reset. If the main SCR is then turned on and commutates properly, the timing circuit will allow operations to continue. If, however, the main SCR again fails to commutate then the field is again disconnected from the armature and is maintained disconnected. Thus, two commutation faults must occur before the motor is disabled.

Other objects and advantages will become apparent in the course of the following detailed description.

DESCRIPTION OF THE PREFERRED EMBODIMENT

Figure 1:
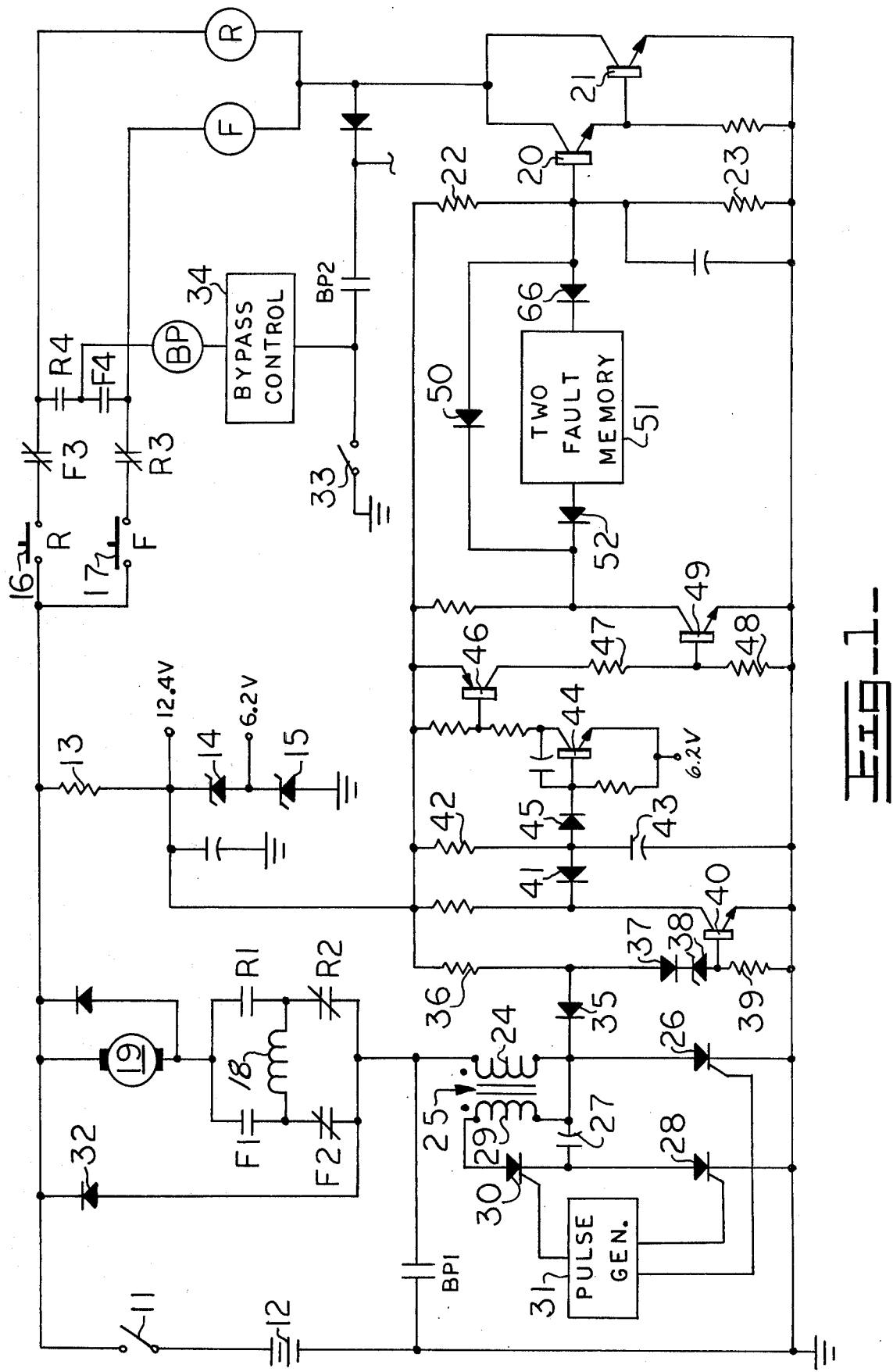
FIG. 1 is a schematic drawing of an SCR control for a direct current motor utilizing the fault-detection circuits of the present invention.

Referring now to the drawings, wherein is shown a preferred embodiment of the invention, and in particular to FIG. 1, main switch 11 enables a source of direct current, e.g., battery 12, to be connected to the circuit. Current can now flow through resistor 13 and zener diodes 14 and 15 to develop regulated +12.4 and +6.2 voltages to power the control circuit.

Direction switches 16 and 17 are provided to alternatively energize one of the forward (F) or reverse (R) relay coils, to connect the field winding 18 in series with the armature 19. For example, if forward switch 17 is closed, it will complete a current path through switch 17, normally closed contacts R3 and forward relay coil F to the Darlington-connected transistors 20 and 21. Resistors 22 and 23, connected between the regulated 12.4 v. supply and ground normally maintain the base of transistor 20 high so that transistors 20 and 21 will conduct whenever one of the direction switches is closed. Thus, closing of forward switch 17 will cause the forward relay coil F to be energized so that its contacts F1 and F2 will close and open, respectively, to connect the field winding 18 to the armature.

Current can now flow from the battery through the armature and field winding, primary 24 of pulse transformer 25 and the main silicon controlled rectifier (SCR) 26, back to the battery.

A commutating capacitor 27 is connected in series with commutating SCR 28, the capacitor and SCR 28 being in parallel with the main SCR 26. A charging path for the capacitor 27 is provided by the loop comprised of capacitor 27, the secondary 29 of pulse transformer 25 and the charging SCR 30.

In operation, gate pulses are applied to the gates of the main and charging SCR's 26 and 30 from pulse generator 31. With the main SCR gated on, current will flow through the motor and the primary of pulse transformer 25, inducing current flow in the secondary 29 which will flow through SCR 30 to charge the capacitor 27 so that its right plate is charged negatively relative to its left plate. When the capacitor 27 is fully charged, SCR 30 will commutate and maintain the charge on the capacitor.

Subsequently, a pulse is applied from pulse generator 31 to gate on the commutating SCR 28 so that the commutating capacitor is connected across the main SCR. The charge on the capacitor will then cause the main SCR to commutate. Current through the motor is maintained during the off-time of the main SCR by means of flyback diode 32.

The pulse rate of pulse generator 31 is typically controlled by a potentiometer actuated in response to position of the foot-actuated accelerator pedal on the vehicle propelled by the motor.

The main SCR 26 and the pulse transformer 25 both introduce some resistance into the motor circuit and thus full battery potential cannot be applied to the motor through the main SCR. In the event the operator wishes to apply full power to the moter he can do so by closing bypass switch 33 (typically coupled to the accelerator pedal for actuation when the pedal is fully depressed). Closure of this switch energizes the bypass control 34 and causes bypass relay BP to be energized. The main bypass relay contacts PB1 close, shorting out the SCR control and connecting the motor terminals directly to the battery.

The fault-detector circuits will now be described. The anode of the main SCR 26 is connected by diode 35 to the junction between resistor 36 and diode 37, diode 37 being connected by zener diode 38 and resistor 39 to ground. When the main SCR 26 is off, its anode voltage is high. Transistor 40 will conduct and its collector potential will be low. If the main SCR is conducting, its anode potential will go low, grounding the bottom of resistor 36 through diode 35 and turning transistor 40 off so that its collector voltage goes high.

The collector of transistor 40 is coupled by diode 41 to a timing circuit comprised of resistor 42 and timing capacitor 43. The values of resistor 42 and capacitor 43 are chosen so that the time required for capacitor 43 to charge to a level sufficient to turn transistor 44 on through diode 45 is longer than the longest on-time conduction period of normal operation of the main SCR.

If the main SCR is functioning properly, the timing capacitor 43 will discharge through diode 41 and transistor 40 each time the main SCR goes off, the transistor 44 will never be turned on. However, if the main SCR fails to turn off (either because it is shorted or the commutation circuit has failed to turn the main SCR off), transistor 40 will remain off so that timing capacitor 43 can charge to a level sufficient to turn transistor 44 on. This is turn causes transistor 46 to turn on so that current flow through resistors 47 and 48 will turn transistor 49 on. The low voltage now across transistor 49 is coupled by diode 50 to the base of transistor 20. Transistors 20 and 21 are thereby turned off, interrupting the energizing path to the direction relay coils F and R. The main contacts of the direction relay restore, thereby disconnecting the field winding 18 from the armature.

Disconnection of the field winding from the armature will interrupt the current path from the battery to the main SCR. If the main SCR is not defective it will thereby be turned off. However, if the main SCR is shorted, its anode will remain at ground potential, thereby maintaining transistor 40 in off condition so that timing capacitor 43 is not reset. Transistors 44, 46 and 49 thus remain in conductive state to ground the base of transistor 20, thereby maintaining transistors 20 and 21 in non-conductive state so that neither direction relay F nor R can be re-energized.

Thus, if the main SCR is shorted, the field winding is disconnected from the armature and cannot be reconnected.

The operator can attempt to resume operations by opening the main switch 11 to remove power from the control circuits. This will allow timing capacitor 43 to discharge and reset itself. The operator may then turn the master switch back on. If the main SCR is still shorted, timing capacitor 43 will again charge sufficiently to cause the transistors 20 and 21 to be non-conductive, as above described, so that the motor will remain disabled.

As described above, the preceding circuit will also cause the field winding to be disconnected from the armature in the event the commutation circuit fails to commutate the main SCr. If the main SCR is not defective, it will commutate when the field is disconnected. The ground connection of the lower end of resistor 36 through diode 35 is now removed, allowing the transistor 40 to go on and reset the timing capacitor 43. This in turn causes transistors 44, 46 and 49 to turn off, removing the low potential from the base of transistor 20. Transistors 20 and 21 can now allow the previously energized direction relays F or R to be reenergized to reconnect the field to the armature.

If the disturbance in the commutation circuit has cleared itself, normal operation of the SCR control will resume automatically.

If, however, the commutating circuit is still defective, the main SCR will be turned back on by the pulse generator 31 but will not commutate. Again, the timing capacitor 43 will charge and cause the field winding to be disconnected from the armature. Thus, if the commutation circuit is defective, the field winding 18 will be repeatedly disconnected and reconnected to the armature at a rate depending upon the RC time constant of resistor 42 and capacitor 43, causing undesired lurching of the vehicle until such time as the closed direction switch 16 or 17 is opened.

Figure 2:
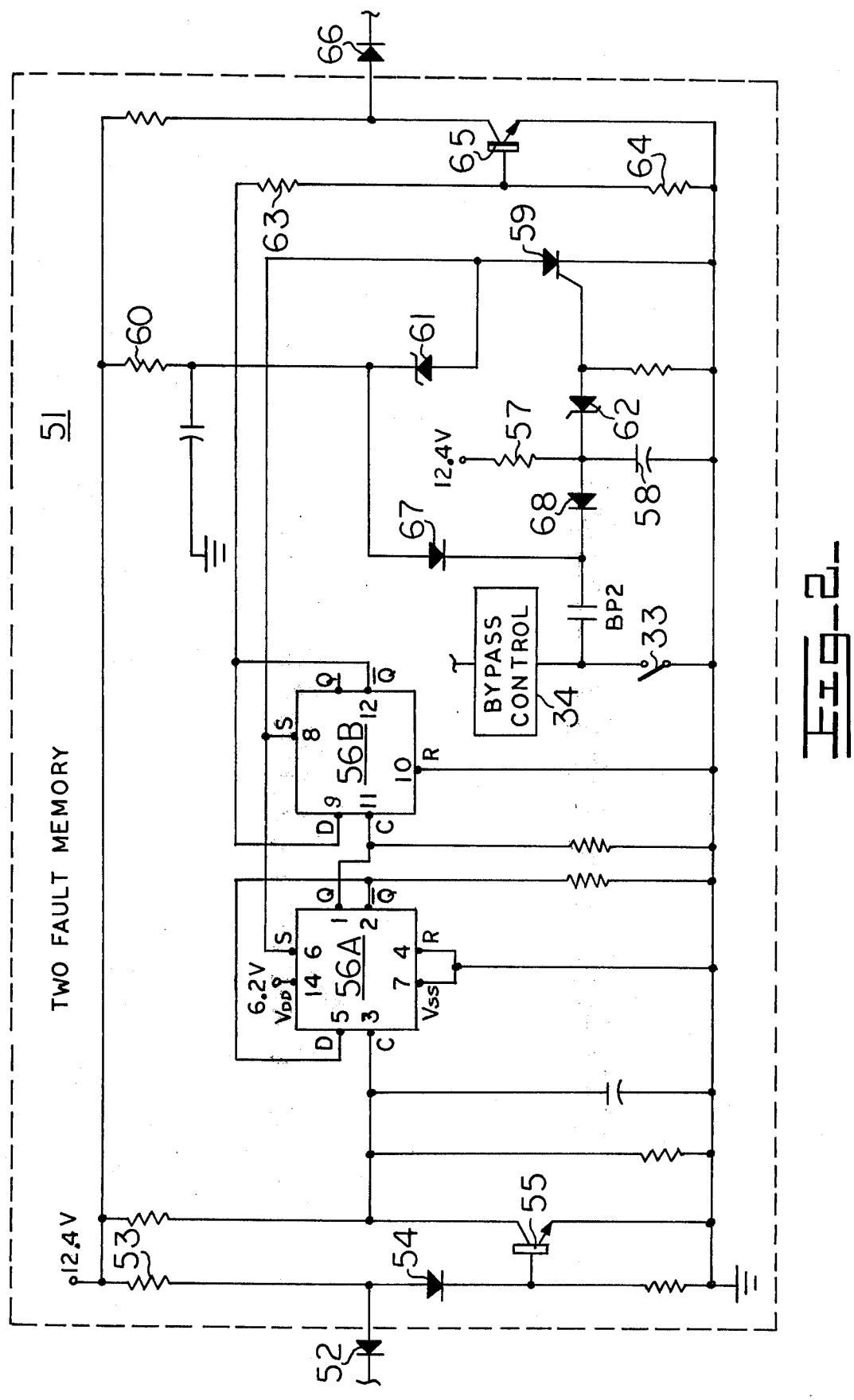
FIG. 2 is a schematic drawing of the two-fault memory circuit of FIG. 1.

In order to prevent the above from occurring, the present circuit includes the two-fault memory 51, the details of which are shown in FIG. 2. In general, the two-fault memory functions to permit one commutation failure to occur and allow the system to return to normal operation if the fault clears when power is removed and reapplied to the motor, but will prevent the direction relays from reclosing in the event of a repeated failure to commutate the main SCR.

As previously described, every time the main SCR fails to commutate, the potential across the collector-emitter of transistor 49 goes low. This low potential is coupled by diode 52 to the two-fault memory 51 and to the junction between resistor 53 and diode 54, causing transistor 55 to turn off. This then applies a high trigger pulse to pin 3 of the commercially available dual-type D flip-flops 56A and 56B each time the main SCR fails to commutate.

When the two-fault memory is first energized, by the application thereto of the regulated 12.4 volts, a timing circuit comprised of resistor 57 and capacitor 58 is used to delay conduction of SCR 59 and thereby prevent circuit noise from affecting the flip-flops by initially maintaining a high signal on pins 6 and 8 through resistor 60 and zener diode 61. Initially also, transistor 55 conducts. Thus, when the circuit is first energized, flip-flop pins 1, 6, 8, 11 and 14 are high, and pins 2, 3, 4, 5, 7, 9, 10 and 12 are low. Pin 13 is also low, but it is not used in the present circuit.

In due course, timing capacitor 58 will charge to a sufficiently high level so that SCR 59 is gated on through zener diode 62 and the conduction of SCR 59 grounds the reset pins 6 and 8. Zener diode 61 applies a regulated 6.2 volts to pin 14. The flip-flops are now ready for operation.

If the main SCR rails to commutate, transistor 55 goes off, causing a high trigger signal to appear at flip-flop pin 3, causing pin 1 to go low and pin 2 to go high. As pin 1 goes low, pin 11 also goes low, but this will not affect the output at pin 12 since a positive pulse is required at pin 11 to cause the output to shift.

Upon failure of the main SCR to commutate the field winding will be disconnected from and reconnected to the armature as previously described.

If the main SCR again fails to commutate, another positive trigger signal will be applied to pin 3. Pin 2 goes low and pin 1 goes high. Pin 11 also goes high so that output pin 12 goes high. This high potential is applied to resistors 63 and 64, causing transistor 65 to turn on. The low voltage now appearing across transistor 65 is coupled by diode 66 to transistor 20 so that its base is grounded through diode 66 and transistor 65 as well as through diode 50 and transistor 49. Transistors 20 and 21 thus cease conducting and cause the field to be again disconnected from the armature.

This logic state of the flip-flops 56A and 56B will not change unless the flip-flops are reset. Thus, transistor 20 will continue to be turned off by diode 66 and transistor 65 even though the grounding path through diode 50 and transistor 49 is interrupted by the turning off of transistor 49.

The operator may remove the 12.4-volt power to the two-fault memory 51, as by opening main switch 11, which will cause SCR 59 to commutate and timing capacitor 58 to discharge. Reclosing of the main switch will provide a reset signal to pins 6 and 8 to reset the flip-flops. If the commutating circuit is still defective, the two-fault memory 51 will again cause the field winding to remain disconnected from the armature after two commutation failures.

The flip-flops may also be reset by accelerating the vehicle to bypass mode. Thus, if the bypass switch 33 and the auxiliary bypass contacts BP2 are closed, diode 67 will commutate SCR 59 and diode 68 will ground and reset the timing capacitor 58. When the vehicle drops back out of the bypass mode, a reset signal will again be present at pins 6 and 8. After the timing period of resistor 57 and capacitor 58, the two-fault memory will again be operative. Two more commutation faults are required before the direction relays are disabled, even if one fault had occurred prior to the control upshifting to the bypass mode. This is advantageous in that it further prevents spurious commutation faults from being a nuisance in operation of the system.

What is claimed is:
1. Means for disabling an electrical drive system including an electric motor and power switching means for coupling said motor across a source of electrical energy, comprising:
   a. sensing means coupled to the power switching means for producing a fault signal in response to each persistence of conductivity of said power switching means beyond a predetermined period of time;
   b. first disable means for producing a disable signal in response to and only during the presence of each fault signal;
   c. second disable means independent of said first disable means and including a counter operable by said fault signals for producing a continuous disable signal in response to and after the presence of a predetermined number of fault signals greater than one;
   d. means independently responsive to said first and second disable means and for interrupting the flow of power to said motor from said source in response to and during the presence of either of said disable signals from said first and second disable means.

2. Means for disabling an electrical drive system as set forth in claim 1, and further including:
   e. bypass means for bypassing said power switching means and connecting said electrical motor directly to said source upon actuation of said bypass means;
   f. means for resetting said counter of said second disable means in response to actuation of said bypass means whereby said disable means will not produce a disable signal after deactuation of said bypass means until the number of fault signals after such deactuation is said predetermined number regardless of the number of such fault signals prior to actuation of said bypass means.

3. In a system for controlling the power delivered to a load from a source of direct current and including a main silicon controlled rectifier through which load current can flow, a pulse generator for repeatedly gating the main silicon controlled rectifier into conduction at a controlled rate, a commutation control for normally commutating the main silicon controlled rectifier at a controlled time each time and after it is gated into conduction, and a direction relay having contacts in series with said load for connecting or disconnecting said load to and from said source of direct current when said direction relay is energized or de-energized respectively, the improvement comprising:
   a. means including a voltage controlled switch for energizing and de-energizing said direction relay when said switch is closed and open respectively,
   b. means for normally applying a voltage to said switch to close said switch,
   c. a capacitor,
   d. a resistor,
   e. means responsive to the state of conduction of said silicon controlled rectifier for charging said capacitor through said resistor when a conductive path is present through said silicon controlled rectifier and for discharging said capacitor when a conductive path is not present through said silicon controlled rectifier,
   f. first means for applying a disabling voltage to said switch to open said switch when and only during the time the charge on said capacitor is above a predetermined voltage, g. means including a counter for counting each time the charge on said capacitor rises to above said predetermined voltage, h. second means, independent of said first means, for applying a disabling voltage to said switch to open said switch and maintain said switch open when said counter reaches a predetermined count greater than one.

4. In a system as set forth in claim 3, and further including:

i. bypass means for bypassing said main silicon controlled rectifier and connecting said load directly to said source upon actuation of said bypass means, j. means for resetting said counter to zero in response to actuation of said bypass means.

* * * * *

UNITED STATES PATENT OFFICE
CERTIFICATE OF CORRECTION

Patent No. 4,017,775　　　　　　　　Dated April 12, 1977

Inventor(s) Robert W. Artrip

It is certified that error appears in the above-identified patent and that said Letters Patent are hereby corrected as shown below:

On the title page, after "Assignee:" - "Cleveland Machine Controls, Inc., Cleveland, Ohio" should read --Towmotor Corporation, Mentor, Ohio--.

Column 1, line 7　　- "(SCr's)" should read --(SCR's)--.

Column 3, line 28　- "moter" should read --motor--.

Column 3, line 33　- "PB1" should read --BP1--.

Column 4, line 29　- "SCr" should read --SCR--.

Signed and Sealed this

Fourteenth Day of November 1978

[SEAL]

Attest:

RUTH C. MASON  
Attesting Officer

DONALD W. BANNER  
Commissioner of Patents and Trademarks